United States Patent [19]

Numakura et al.

[11] Patent Number: 4,851,928
[45] Date of Patent: Jul. 25, 1989

[54] APPARATUS FOR RECORDING LOW AND HIGH BOND COMPONENTS OF A CHROMINANCE SIGNAL

[75] Inventors: Toshihiko Numakura, Kanagawa; Masahiro Kanbara, Tokyo, both of Japan

[73] Assignee: Sony Corporation, Tokyo, Japan

[21] Appl. No.: 167,362

[22] Filed: Mar. 14, 1988

[30] Foreign Application Priority Data

Mar. 20, 1987 [JP] Japan .................................. 62-66292

[51] Int. Cl.$^4$ ........................ H04N 9/79; H04N 9/80; H04N 9/83
[52] U.S. Cl. ..................................... 358/330; 358/310
[58] Field of Search .................. 358/12, 310, 327, 330

[56] References Cited

U.S. PATENT DOCUMENTS 4,695,899 9/1987 Nagano et al. ...................... 358/310

Primary Examiner—Robert L. Richardson
Attorney, Agent, or Firm—Philip M. Shaw, Jr.

[57] ABSTRACT

A magnetic recording and/or reproducing apparatus and methods thereof for a composite color TV (television) signal arranged such that a luminance signal and a high band component of a chrominance subcarrier signal of the composite color TV signal are frequency modulated, recorded and reproduced, while a low band component of the chrominance subcarrier signal is frequency down converted to a frequency at a band lower than that of the frequency modulated signal, thus improving resolution of the color signal component.

10 Claims, 4 Drawing Sheets

APPARATUS FOR RECORDING LOW AND HIGH BOND COMPONENTS OF A CHROMINANCE SIGNAL

BACKGROUND OF THE INVENTION

1. Field of the Invention

The present invention relates generally to color video tape recorders and more particularly to a magnetic recording and/or reproducing apparatus and methods thereof for recording and/or reproducing a composite color TV (television) signal.

2. Description of the Prior Art

A known home video tape recorder (VTR) according to the so-called U-matic (trade name) standard employs what might be called a "color under" system. According to the color under system, during recording, a luminance signal is frequency-modulated to be an FM luminance signal and a carrier chrominance signal is frequency-converted into a "frequency down converted" signal so as to have a frequency which is lower than that of the FM luminance signal. Then, the frequency down converted chrominance signal and the FM luminance signal are frequency-multiplexed and then recorded on a magnetic tape. During reproduction, the original color video signal is reproduced by performing the signal processing in the opposite fashion to the signal processing employed during recording.

In the NTSC color TV system, as shown in FIG. 1A, the band of the luminance signal Y lies within a range of about 0 to 4.2 MHz and has a color subcarrier frequency of fs ($\simeq$3.58 MHz). The band of the carrier chrominance signal C lies within a range from fs+0.5 MHz to fs−1.5 MHz. In FIG. 1A, a burst signal is represented by reference letter B.

In the thus arranged color under system VTR, however, the carrier chrominance signal is frequency down converted and cannot keep a sufficiently wide band so that the band of the recorded and then reproduced carrier chrominance signal C lies within a range of about fs±0.5 MHz. For this reason, the color under system VTR cannot record and reproduce color video signals without degrading the resolution of the color signal component.

A professional VTR employs a so-called "direct" system in which the color video signal is directly converted into the FM signal and then recorded and reproduced. Thus, the resolution of the color signal component can be protected from being degraded. But, if a home VTR employs the direct system for recording and reproduction, the band width in which the signal is recorded and reproduced is not sufficiently wide, thereby lowering the S/N (signal-to-noise) ratio and producing moire. Therefore, a home VTR that employs the direct system is not useful in practice.

OBJECTS AND SUMMARY OF THE INVENTION

Accordingly, it is an object of the present invention to provide an improved magnetic recording and/or reproducing apparatus and methods thereof for a composite color TV signal.

Another object of the present invention is to provide a magnetic recording and/or reproducing apparatus and methods thereof which can improve resolution of a color signal component.

Still another object of the present invention is to provide a magnetic recording and/or reproducing apparatus and methods thereof which can prevent the S/N (signal-to-noise) ratio from being deteriorated and which can avoid moire.

A further object of the present invention is to provide a magnetic recording and/or reproducing apparatus and methods thereof which can produce a luminance signal whose S/N ratio is excellent.

A further object of the present invention is to provide a magnetic recording and/or reproducing apparatus and methods thereof which can prevent deterioration of phase and frequency characteristics.

A still further object of the present invention is to provide a magnetic recording and/or reproducing apparatus suitable for use as a color under system video tape recorder.

A yet further object of the present invention is to provide a magnetic recording and/or reproducing apparatus and methods thereof which can process a color TV signal of so-called high definition system.

According to an aspect of the present invention, there is provided a magnetic recording apparatus for a composite color TV signal comprising means for extracting from an input composite color TV signal a luminance signal component and a high band component of a chrominance subcarrier signal component, frequency modulator means for generating a carrier signal and frequency modulating the carrier signal by both of said components, means for extracting a low band component of said chrominance subcarrier signal component contained in said input composite color TV signal, converter means for frequency down converting the frequency of said low band component signal to a frequency at the low band side of the carrier signal modulated by said frequency modulator means, and means for frequency multiplexing said modulated carrier signal and said frequency down converted component and for outputting said frequency-multiplexed signal to a video recording head.

The thus recorded luminance signal and said carrier chrominance signal are reproduced from said recording medium by an apparatus comprising means for reproducing said FM signal and said frequency converted low band component from said recording medium, means for demodulating said reproduced FM signal into a sum signal of said luminance signal and high band components of said carrier chrominance signal, means for frequency modulating a reference alternating signal with jitter components which are the same as those in a sum signal of a high band component of said demodulated carrier chrominance signal and a low band component of said reproduced carrier chrominance signal, means for frequency converting said reproduced low band component into a band component at the original frequency band of said reference alternating signal, means for adding said frequency converted carrier chrominance signal to said sum signal of said demodulated luminance signal and the high band component of said carrier chrominance signal to thereby produce a sum signal of said luminance signal and said carrier chrominance signal, and means for timebase correcting said sum signal and for producing said timebase corrected sum signal as a reproduced output.

According to a further aspect of the present invention, there is provided a method of recording a composite color TV signal comprising the steps of frequency converting a signal which is the sum of a luminance signal and high band components of a carrier chrominance signal into an FM signal, frequency down converting a low band component of the carrier chrominance signal to a signal at a band lower than that of said frequency converted FM signal, adding and frequency multiplexing said frequency converted low band component and said frequency converted FM signal, and supplying said frequency multiplexed signal to a recording head for recording said frequency multiplexed signal on a recording medium.

The thus recorded luminance signal and said carrier chrominance signal are reproduced from a recording medium, by a method comprising the steps of reproducing said FM signal and said frequency converted low band component from said recording medium, demodulating said reproduced FM signal into said sum signal of said luminance signal and said high band components of said carrier chrominance signal, adding to a reference alternating signal jitter components which are the same as those of said sum signal of said high band component of said demodulated carrier chrominance signal and said low band component of said reproduced carrier chrominance signal, frequency converting said reproduced low band component into an original band by said reference alternating signal, adding said frequency converted carrier chrominance signal to a sum signal of said demodulated luminance signal and the high band component of said demodulated carrier chrominance signal to thereby produce a sum signal of said luminance signal and said carrier chrominance signal, and timebase correcting said sum signal to produce a reproduced output.

These and other objects, features and advantages of the present invention will become apparent from the following description of the illustrative embodiments, throughout which like reference numerals represent the same or similar parts and elements.

DETAILED DESCRIPTION OF THE PREFERRED EMBODIMENTS

The present invention will now be described in detail with reference to the drawings.

Figure 1:
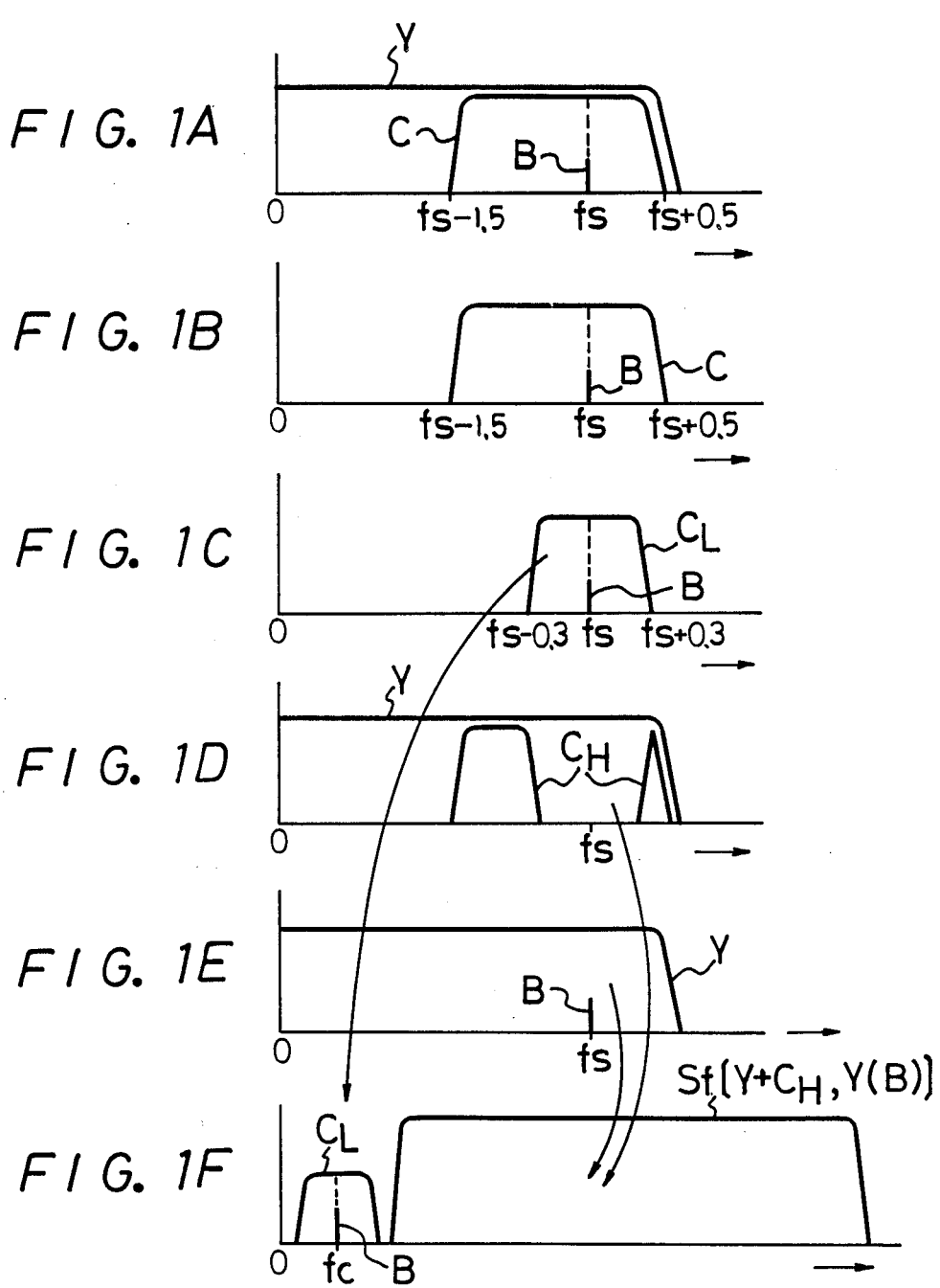
FIGS. 1A to 1F are frequency characteristic representations used to explain the present invention.
Figure 2:
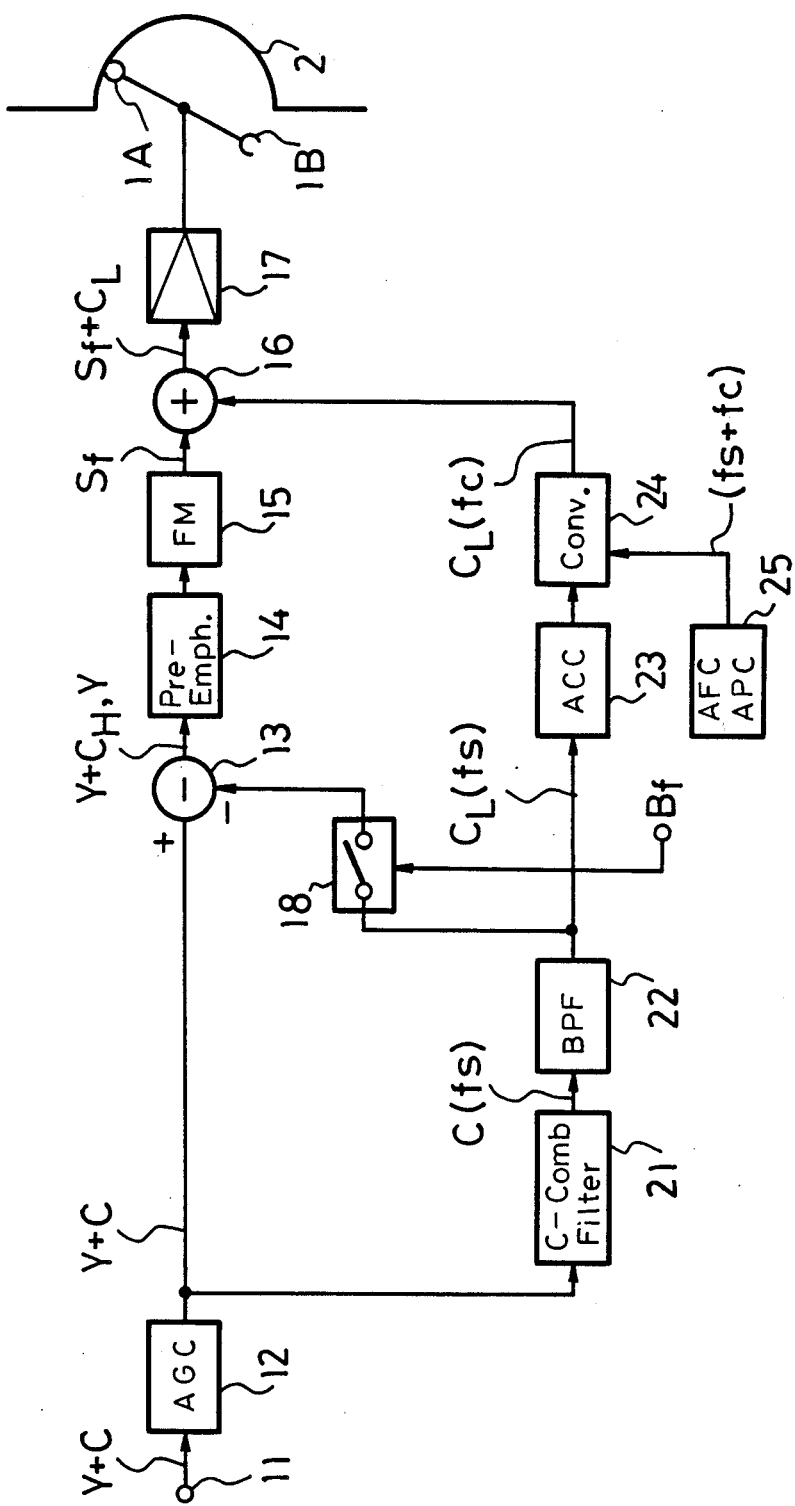
FIG. 2 is a block diagram showing a recording system of an embodiment of the present invention.

FIG. 2 shows the circuitry of a recording system of the magnetic recording and/or reproducing apparatus according to the present invention. Referring to FIG. 2, the composite color video signal (Y+C) shown in FIG. 1A is applied to an input terminal 11 and supplied through an automatic gain control (AGC) circuit 12 to a subtracting circuit 13. This composite color video signal (Y+C) from the AGC circuit 12 is also supplied to a C-type comb filter 21 which then produces a carrier chrominance signal C that contains the burst signal B as shown in FIG. 1B. The carrier chrominance signal C is next supplied to a band-pass filter 22, in which it is limited in band and is thereby produced as a low band component $C_L$ (containing the burst signal B) shown in FIG. 1C. For example, the low band component $C_L$ can have a frequency lying within a range of fs±0.3 MHz. Strictly speaking, this low band component $C_L$ is the narrow band components modulated by the low band component of a color difference signal. This signal $C_L$ is supplied to the subtracting circuit 13 through a switching circuit 18. The switching circuit 18 is turned on during the non-burst period and turned off during the burst period in response to a burst flag pulse Bf.

Consequently, since during the non-burst period the subtracting circuit 13 subtracts the low band converted chroma signal $C_L$ from the composite color video signal (Y+C), the subtracting circuit 13 produces a signal (Y+$C_H$). The signal (Y+$C_H$) results from adding the luminance signal Y and the high band component $C_H$ of the carrier chrominance signal C as shown in FIG. 1D. Strictly speaking, the high band component $C_H$ is the outside band components modulated by the high band component of the color difference signal. Since during the burst period the subtracting circuit 13 does not carry out the subtraction, the subtracting circuit 13 produces the luminance signal Y with the burst signal B as shown in FIG. 1E.

Then, the signal (Y+$C_H$) and the luminance signal Y different from the former in time are supplied from the subtracting circuit 13 through a pre-emphasis circuit 14 to an FM modulating circuit 15, in which they are converted into an FM signal Sf that is distributed in the high band side as shown by the arrows in FIGS. 1D, 1E and 1F. The signal Sf is supplied to an adding circuit 16.

The signal $C_L$ from the band-pass filter 22 is supplied through an automatic chrominance control (ACC) circuit 23 to a frequency converting circuit 24. An automatic frequency control/automatic phase control (AFC/APC) circuit 25 produces an alternating signal with frequency (fs+fc) where fc=43.75 fh (≃688 kHz and fh represents the horizontal frequency). Also, this alternating signal from the AFC/APC circuit 25 is supplied to the frequency converting circuit 24, in which the above signal $C_L$ is frequency-converted into a signal $C_L$ whose color subcarrier frequency is converted from the frequency fs to the frequency fc as shown by the arrows in FIGS. 1C and 1F. The thus frequency converted signal $C_L$ is supplied to the adding circuit 16.

Thus, the adding circuit 16 produces a sum signal (Sf+$C_L$) of the signals Sf and $C_L$, that is, a frequency multiplexed signal (Sf+$C_L$) of the FM signal Sf and the low band component $C_L$ of the low band converted carrier chrominance signal C, as shown in FIG. 1F. This frequency multiplexed signal (Sf+$C_L$) is supplied through a recording amplifier 17 to rotary heads 1A and 1B.

The rotary heads 1A and 1B are mounted on a rotary drum (not shown) with an angular spacing of 180° and servo-controlled to rotate at a frame frequency in synchronism with the luminance signal Y by a servo circuit (not shown). A magnetic tape 2 is obliquely wrapped around the peripheral surface of the rotary drum over an angular range of larger than 180° and is transported at a predetermined tape speed. Thus, the signal (Sf+$C_L$) is sequentially recorded on the magnetic tape 2 as a skewed magnetic track with a guard band area between adjacent tracks at every field period.

Figure 3:
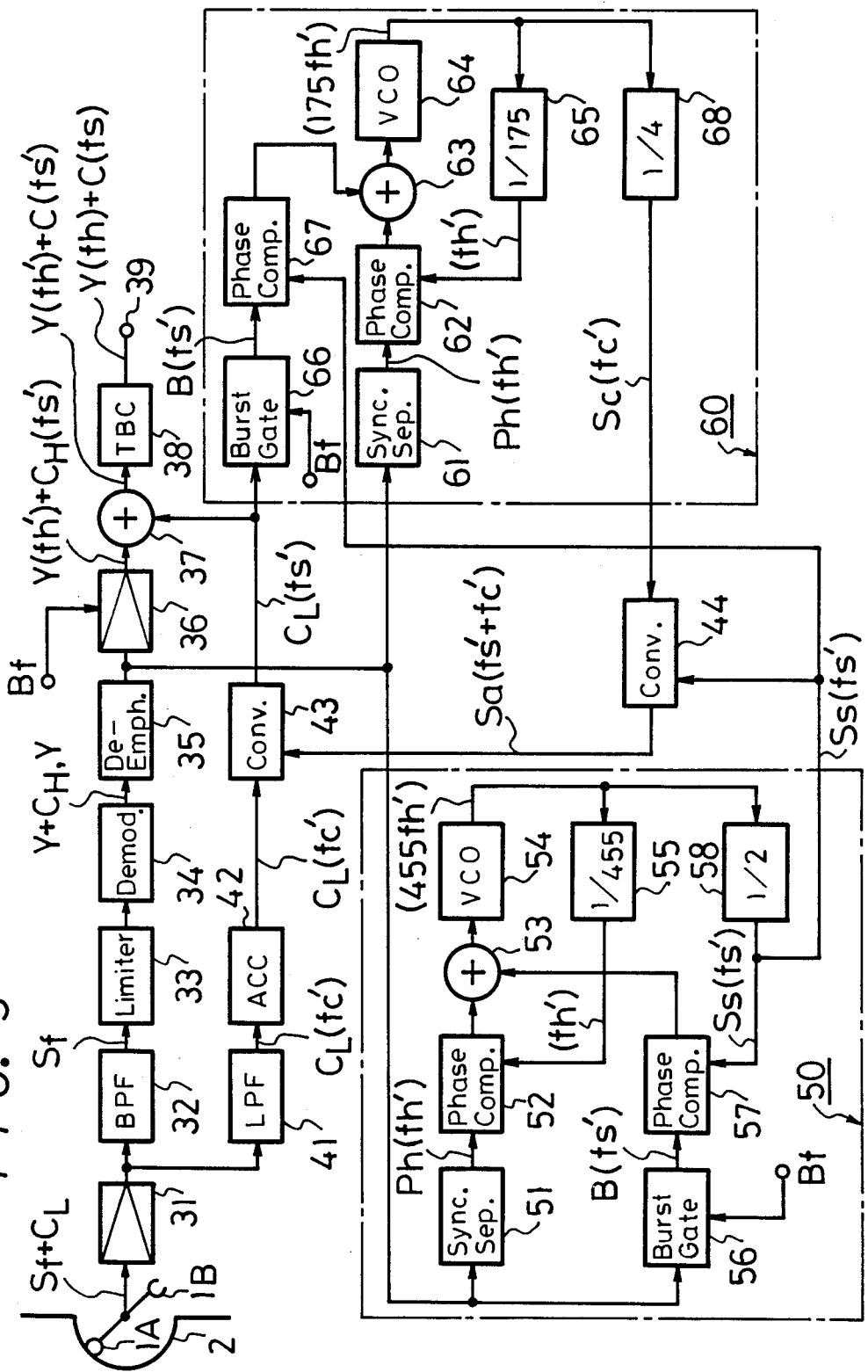
FIG. 3 is a block diagram showing a reproducing system thereof.

FIG. 3 illustrates a reproducing system of the present invention. Referring to FIG. 3, a servo circuit (not shown) tracking-servo-controls the rotary heads 1A and 1B to properly track the recorded track of the magnetic tape 2 so that the rotary heads 1A and 1B reproduce the frequency multiplexed signal (Sf+$C_L$). In this case, however, the signals Y, $C_H$ and $C_L$ forming the signal (Sf+$C_L$) contain common jitter components caused by the recording and reproducing system so that the respective synchronizing frequencies thereof are changed from the normal frequencies of fh, fs and fc to fh′, fs′and fc′, respectively, containing the common jitter components.

The reproduced signal (Sf+$C_L$) from the rotary heads 1A and 1B is supplied through a playback amplifier 31 to a band-pass filter 32 from which the frequency modulated signal Sf is derived. The signal Sf is supplied through a limiter 33 to an FM demodulating circuit 34 and is thereby demodulated into the signal (Y+$C_H$) corresponding to FIG. 1D during the non-burst period and into the signal Y corresponding to FIG. 1E during the burst period. These signals (Y+$C_H$) and Y are supplied through a de-emphasis circuit 35 to a switching or gain control circuit 36.

The switching or gain control circuit 36 is controlled by the burst flag pulse Bf so as to produce an output signal containing only a color subcarrier during the non-burst period. Thus, the gain control circuit 36 produces only the signal (Y+$C_H$) whose burst signal is removed. The signal (Y+$C_H$) contains the jitter components and the respective synchronizing frequencies thereof are fh′ and fs′ as mentioned before.

The signal (Sf+$C_L$) from the playback amplifier 31 is supplied to a low-pass filter 41 which then produces the low band component $C_L$ of the carrier chrominance signal C of which the color subcarrier frequency is fc′. This signal $C_L$ is supplied through an ACC circuit 42 to a frequency converter circuit 43. Also, the frequency converter circuit 43 receives an alternating signal Sa having a frequency (fs′+fc′) and jitter components, as will be described in greater detail later. Then, the frequency converting circuit 43 converts the frequency of the signal $C_L$ from the carrier frequency fc′ into the carrier frequency fs′. The frequency-converted signal $C_L$ is supplied to an adding circuit 37.

Consequently, the adding circuit 37 adds the signal (Y+$C_H$) and the signal $C_L$ to produce the original composite color video signal (Y+C) corresponding to FIG. 1A. But, this signal (Y+C) contains the jitter components and the respective synchronizing frequencies thereof are fh′ and fs′. It is therefore supplied to a time base corrector (TBC) 38, in which it is timebase-corrected and then produced at a terminal 39 as the original composite color video signal (Y+C) containing no jitter components. The TBC 38 may be incorporated in or connected to the VTR independently.

In this case, in order to form the jitter component free composite color video signal (Y+C) from the composite color video signal (Y+C) containing jitter components by mans of the common TBC 38, the respective signal components Y, $C_H$ and $C_L$ must contain correlated jitter components. In other words, the subcarrier fs′ of the high frequency chrominance component $C_H$ containing jitter components and the subcarrier fs′ of the low band chrominance component $C_L$ containing jitter components must be phase matched with each other. To this end, the above frequency-converting alternating signal Sa is formed by two AFC/APC circuits 50 and 60 as follows.

The signals (Y+$C_H$) and Y each containing the jitter components from the de-emphasis circuit 35 are supplied to a synchronizing separating circuit 51 which produces a horizontal synchronizing pulse Ph with frequency fh′ containing the jitter component. This horizontal synchronizing pulse Ph is supplied to a phase comparing circuit 52. Also, a VCO (voltage-controlled oscillator) 54 produces an oscillation signal whose free-running frequency is 455fh. This oscillation signal is supplied to a frequency dividing circuit 55, in which it is divided by 455 and made a frequency-divided signal having the frequency fh. This frequency-divided signal is supplied to the phase comparing circuit 52 and the phase-compared output therefrom is supplied through an adding circuit 53 to the VCO 54 as a control signal thereof.

Consequently, in the stationary state, the oscillation frequency of the VCO 54 becomes a frequency 455fh′ that contains a jitter component in synchronism with the pulse Ph.

The signals (Y+$C_H$) and Y from the de-emphasis circuit 35 are further supplied to a burst gate circuit 56 which then extracts a burst signal B having a frequency fs′ containing a jitter component. This burst signal B is supplied to a phase comparing circuit 57. The oscillation signal from the VCO 54 is also supplied to a frequency dividing circuit 58, in which it is divided by 2 to be a frequency-divided signal Ss having a frequency fs′ (=455fh′/2) and a phase containing jitter components, which correspond with those of the signal (Y+$C_H$) from the de-emphasis circuit 35, is supplied to a frequency converter 44 and the phase comparing circuits 57 and 67. The phase-compared output from the phase comparing circuit 57 is supplied through the adding circuit 53 to the VCO 54 as a control signal. Thus, in the stationary state, the phase of the oscillation signal from the VCO 54 is synchronized with the burst signal B containing the jitter component.

The signals (Y+$C_H$) and Y containing the jitter components from the de-emphasis circuit 35 are also supplied to a synchronizing separating circuit 61 in the AFC/APC circuit 60. The synchronizing separating circuit 61 produces a horizontal synchronizing pulse Ph having a frequency fh′ containing a jitter component. This pulse Ph is supplied to a phase comparing circuit 62, and a VCO 64 produces an oscillation signal whose free-running frequency is 175fh. This signal is supplied to a frequency dividing circuit 65, in which it is divided by 175 and is thereby made a frequency-divided signal having a frequency fh. This signal is supplied to the phase comparing circuit 62 an the phase-compared output therefrom is supplied through an adding circuit 63 to the VCO 64 as a control signal. Consequently, in the stationary state, the oscillation frequency of the VCO 64 becomes the frequency 175fh′ containing a jitter component in synchronism with the horizontal synchronizing pulse Ph.

Further, the signal $C_L$ from the frequency converter 43 is supplied to a burst gate circuit 66 which then produces a burst signal B having the frequency fs′ containing a jitter component. This burst signal B is supplied to a phase comparing circuit 67 which is also supplied with the signal Ss from the frequency dividing circuit 58. The phase-compared output from the phase comparing circuit 67 is supplied through the adding circuit 63 to the VCO 64 as a control signal thereof.

Then, the oscillation signal from the oscillating circuit 64 is supplied to a frequency dividing circuit 68, in which it is divided by 4 and is thereby made a frequency-divided signal Sc having the frequency fc′ (=177fh′/4) containing a jitter component. This signal Sc is supplied to the converter 44. Thus, the converter 44 adds the frequencies of the signal Ss and the signal Sc so that the converter 44 produces a reference alternating signal Sa (fs'+fc') having the jitter component. In response to this alternating signal Sa, the frequency converter 43 converts the frequency of the signal $C_L$ as described hereinabove.

Therefore, on the basis of the synchronizing signals Ph and B of the output signal (Y+C) from the de-emphasis circuit 35, the AFC/APC circuit 50 performs an open loop AFC/APC operation for the signal $C_L$ from the converter 43. While, on the basis of the synchronizing pulse Ph in the output signal from the de-emphasis circuit 35 and the burst signal B in the output signal from the converter 43, the AFC/APC circuit 60 performs a closed loop AFC/APC operation for the signal $C_L$. As a result, the signal (Y+$C_H$) and the signal $C_L$ supplied to the adding circuit 37 come to have the same jitter component. Thus, the adding circuit 37 produces the original carrier chrominance signal C containing jitter components in which the phases of the high band component $C_H$ and the low band component $C_L$ are matched with each other and the luminance signal Y has jitter components which are the same as those of the carrier chrominance signal C. Therefore, the TBC 38 can process the composite color video signal and remove the jitter component therefrom.

According to the present invention, as described above, during recording, the luminance signal Y and the high band component $C_H$ of the carrier chrominance signal C are converted into the FM signal Sf, the low band component $C_L$ of the carrier chrominance signal C is frequency down converted into a signal having a frequency lower than the FM signal Sf, and the frequency down converted signal $C_L$ and the FM signal Sf are frequency-multiplexed and recorded as the frequency-multiplexed signal (Sf+$C_L$). During reproduction, the reproduced signals are processed in the opposite fashion and the recording and reproducing band width for the carrier chrominance signal C is widened so that the whole band components of, for example, about 2 MHz of the carrier chrominance signal C can be recorded and reproduced without degrading the resolution of the color component.

Although the high band component $C_H$ of the carrier chrominance signal C together with the luminance signal Y is converted into the FM signal Sf, the energy of the high band component $C_H$ is small so that the S/N ratio is not degraded and moire is not produced, unlike a recording and reproducing VTR of the direct system.

Further, since the frequency down converted low band component $C_L$ of the carrier chrominance signal C has a band width (0.6 MHz) narrower than that of the frequency down converted carrier chrominance signal (1 MHz) in the standard color under system VTR, the band width of the FM signal Sf can be widened. Thus, it is possible to obtain a luminance signal Y whose resolution is excellent and which has a satisfactory S/N ratio. Furthermore, since the band width is narrow, the phase and frequency characteristics are prevented from being deteriorated.

In addition, the magnetic recording and reproducing apparatus of the present invention can be applied to a standard color under system VTR with less modifications and can also be applied to a color video signal of the so-called high definition system.

Figure 4:
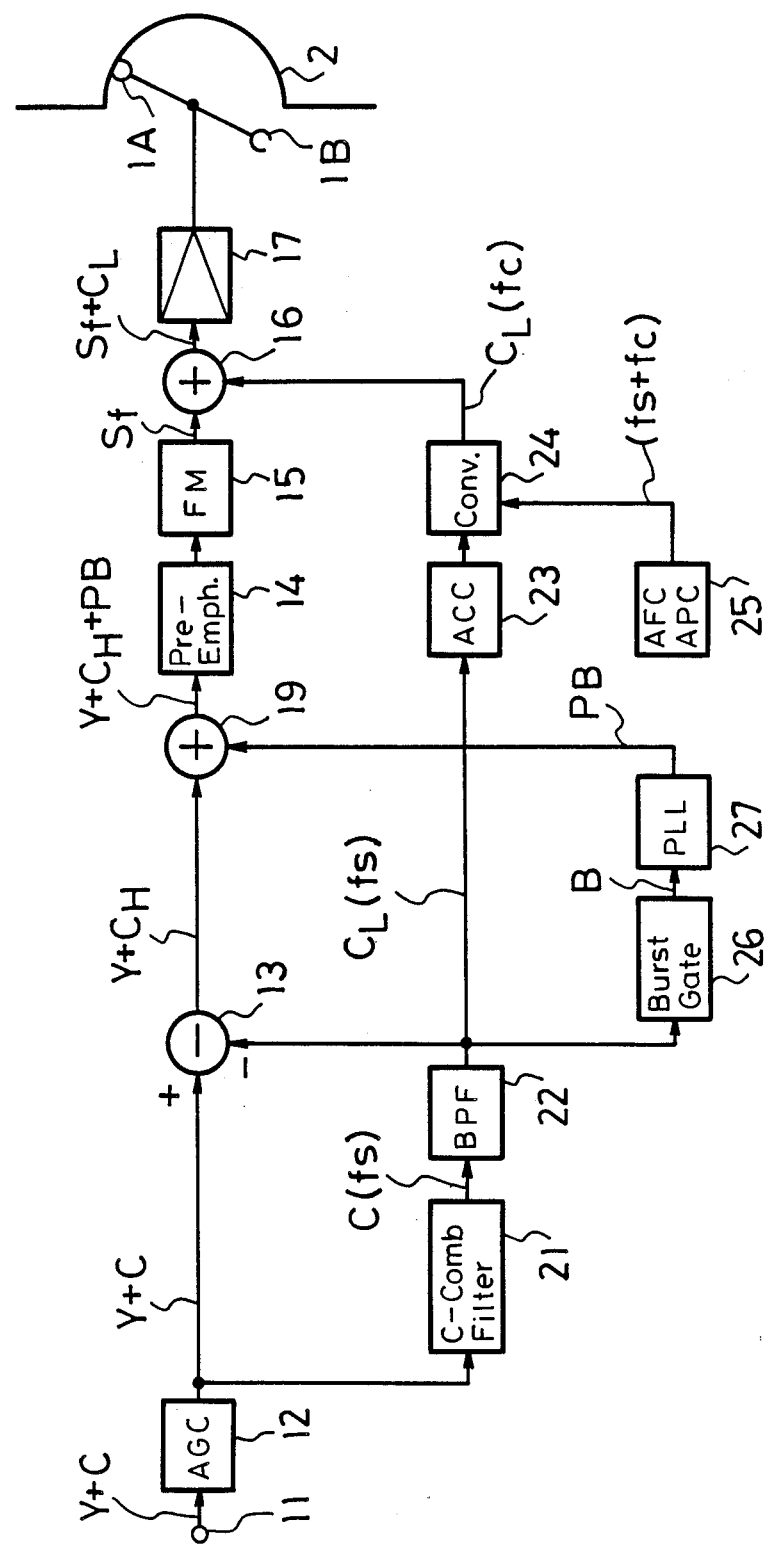
FIG. 4 is a block diagram showing another embodiment of the recording system according to the present invention.

FIG. 4 illustrates another embodiment of the recording system of the apparatus according to the present invention. In FIG. 4, like parts corresponding to those of FIG. 2 are marked with the same references and therefore need not be described in detail.

According to this embodiment, as shown in FIG. 4, the burst signal eliminating switching circuit 18 (FIG. 2) interposed between the band-pass filter 22 and the subtracting circuit 13 is removed so that the subtracting circuit 13 produces the signal (Y+$C_H$) but it does not produce the burst signal B even during the burst period.

The signal $C_L$ from the band-pass filter 22 is supplied to a burst gate circuit 26 which then produces the burst signal B. This burst signal B is supplied to a PLL (phase-locked loop) circuit 27 which produces a pilot burst signal PB having a frequency lower than the frequency fs in a constant frequency relation to the burst signal B and which is synchronized with the burst signal B, for example, a pilot burst signal PB having a frequency fs/2, during the burst period. This pilot burst signal PB is supplied to an adding circuit 19 and is thereby mixed with the signal (Y+$C_H$) from the subtracting circuit 13.

In the reproducing system, though not shown, the pilot burst signal PB is produced from the burst gate circuit 56 in place of the burst signal B (fs') in FIG. 3 and then fed to the phase comparing circuit 57. Also, the signal Ss is frequency divided or converted into a signal with a frequency which is the same as that of the pilot burst signal PB and is then fed to the phase comparing circuit 57.

Therefore, also in this case, the recording and the reproduction are carried out in exactly the same fashions a those in FIGS. 2 and 3.

In a reproducing circuit of a home VTR that carries out so-called azimuth recording without forming a guardband area between the adjacent tracks or a VTR in which the recording phase of the chroma signal is shifted by 180° or 90° at every horizontal period to thereby cancel a crosstalk component between the adjacent tracks of the chroma signal, a C-type comb filter may be provided at the next stage of the converter 43. Furthermore, the C-type comb filter 21 may be removed in order to further simplify the circuit arrangement of the reproducing system.

Furthermore, the AFC/APC circuit 25 can serve as the AFC/APC circuit 60. In addition, the present invention can be applied to a color signal processor of a CCIR system color VTR or a color signal processor for an electronic still camera.

It should be understood that the above description is presented by way of example on the preferred embodiments of the present invention and it will be apparent that many modifications and variations could be effected by one with ordinary skill without departing from the spirit and scope of the novel concepts of the invention, so that the scope of the invention should be determined only by the appended claims.

We claim as our invention:

1. An apparatus for magnetically recording a composite color TV signal containing luminance and chrominance-subcarrier signal components, comprising:
   (a) first extracting means for extracting the luminance signal component and a high band component of the chrominance subcarrier signal component from an input composite color TV signal;
   (b) frequency modulator means for generating a carrier signal which is frequency modulated by both the luminance signal component and the high band component of the chrominance subcarrier signal component;
   (c) second extracting means for extracting a low band component of said chrominance subcarrier signal component contained in said input composite color TV signal;

(d) converter means for frequency down converting said low band component signal to a signal having a frequency at the low band side of the frequency modulated carrier signal; and (e) means for frequency multiplexing said frequency modulated carrier signal component and said down converted signal and for outputting said frequency-multiplexed signal to a video recording head.

2. A magnetic recording apparatus for a composite color TV signal according to claim 1, wherein the first extracting means includes subtracting means for subtracting the low band component of said chrominance subcarrier signal component from said input composite color TV signal to produce the high band component of said chrominance subcarrier signal 3. A magnetic recording apparatus for a composite color TV signal according to claim 1 further comprising means for leaving a color burst signal of said input color TV signal in both during the burst period thereof.

4. A magnetic recording apparatus for a composite color TV signal according to claim 1, wherein both said luminance component and said high band component of the chrominance subcarrier component are mixed with a reference pilot signal that is generated instead of and in synchronism with the color burst signal in said input color TV signal.

5. A magnetic recording apparatus for a composite color TV signal according to claims 1, 2, 3 or 4, wherein said second extracting means is formed of a band-pass filter having pass band narrower than that of said chrominance subcarrier component in said input composite color TV signal.

6. A magnetic recording apparatus for a composite color TV signal according to claim 5, wherein said band-pass filter has a pass band ranging from about ±0.3 MHz from the center frequency of the subcarrier.

7. A magnetic recording apparatus for a composite color TV signal according to claim 1 further comprising:

- recording means, including a recording/reproducing head for recording said frequency-multiplexed signal on a recording medium;

means connected to said recording/reproducing head for reproducing said frequency-multiplexed signal from said recording medium and extracting therefrom said frequency modulated carrier signal and said frequency converted low band component, each of said reproduced signals including jitter components;

means for demodulating said reproduced frequency modulated carrier signal into a first sum signal of said luminance signal and said high band component of said carrier chrominance signal, said first sum signal including jitter components;

means for generating a reference alternating signal having jitter components which are the same as those in said first sum signal;

means supplied with said reference alternating signal for frequency converting said reproduced low band component of said carrier chrominance signal into the frequency of said reference alternating signal;

means for adding said frequency converted low band component of said carrier chrominance signal to said first sum signal to thereby produce a second sum signal of said luminance signal and said carrier chrominance signal, wherein said luminance signal has jitter components which are in phase with the jitter components of said carrier chrominance signal; and means for timebase correcting said second sum signal and for producing said timebase corrected sum signal as a reproduced output.

8. An apparatus according to claim 7, wherein said means for generating said reference alternating signal includes means for extracting jitter components from the reproduced luminance signal component and the high band carrier chrominance signal component obtained from said demodulating means, and means for extracting a jitter component from the frequency down converted band component of the carrier chrominance signal derived from said frequency converting means.

9. A method of recording a composite color TV signal comprising the steps of:

extracting the luminance signal component and a high band component of the chrominance subcarrier signal component from an input composite color TV signal;

frequency converting a first sum signal of the luminance signal and the high band component of the chrominance subcarrier signal into a frequency modulated signal;

extracting a low band component of said chrominance subcarrier signal component contained in said input composite color TV signal;

frequency down converting said low band component of said chrominance subcarrier signal to a signal at a band lower than that of said frequency modulated signal;

adding and frequency multiplexing said frequency converted low band component and said frequency modulated signal; and supplying said frequency multiplexed signal to a recording head for recording said frequency multiplexed signal on a recording medium..

10. A method of reproducing a composite color TV signal from a recording medium on which a frequency multiplexed signal has been recorded, the frequency multiplexed signal being the product of taking a sum signal of a luminance signal and a high band component of a chrominance subcarrier signal, frequency modulating the sum signal into an frequency modulated signal, frequency down converting a low band component of said chrominance subcarrier signal to a signal at a band lower than that of said frequency modulated signal, adding said frequency converted low band component and said frequency modulated signal and frequency multiplexing the result, supplying it to a recording head and recording it on the recording medium, the reproducing method comprising the steps of:

reproducing said frequency modulated signal and said frequency converted low band component from said recording medium;

demodulating said reproduced frequency modulated signal into a first sum signal of said luminance signal and said high band component of said chrominance subcarrier signal;

generating a reference alternating signal and adding to it jitter components which are the same in phase as those of said first sum signal of said high band component of said demodulated chrominance subcarrier signal and said low band component of said reproduced chrominance subcarrier signal;

using the reference alternating signal to frequency convert said reproduced low band component into a frequency at the band of said reference alternating signal;

adding said frequency converted chrominance subcarrier signal to said first sum signal to thereby produce a second sum signal of said luminance signal and said chrominance subcarrier signal; and timebase correcting the second sum signal to produce a reproduced output.

* * * * *

UNITED STATES PATENT AND TRADEMARK OFFICE
CERTIFICATE OF CORRECTION

PATENT NO. : 4,851,928

DATED : 7/25/89

INVENTOR(S): N. Toshinhiko, et al.

It is certified that error appears in the above - identified patent and that said Letters Patent is hereby corrected as shown below:

In the title: The title should read as follows:

APPARATUS FOR RECORDING LOW AND HIGH BAND COMPONENTS OF A CHROMINANCE SIGNAL

Signed and Sealed this

Twenty-seventh Day of February, 1990

Attest:

JEFFREY M. SAMUELS

Attesting Officer

Acting Commissioner of Patents and Trademarks